(12) United States Patent
McCue

(10) Patent No.: US 9,631,125 B2
(45) Date of Patent: Apr. 25, 2017

(54) DISSOLVABLE, ADHESIVE CONSTRUCTION

(71) Applicant: Geoff McCue, Lawrence, KS (US)

(72) Inventor: Geoff McCue, Lawrence, KS (US)

( * ) Notice: Subject to any disclaimer, the term of this patent is extended or adjusted under 35 U.S.C. 154(b) by 0 days.

(21) Appl. No.: 14/560,166

(22) Filed: Dec. 4, 2014

(65) Prior Publication Data

US 2016/0108288 A1    Apr. 21, 2016

Related U.S. Application Data

(60) Provisional application No. 62/064,654, filed on Oct. 16, 2014.

(51) Int. Cl.
*C09J 7/02* (2006.01)

(52) U.S. Cl.
CPC ........... *C09J 7/026* (2013.01); *C09J 2203/31* (2013.01); *C09J 2203/334* (2013.01)

(58) Field of Classification Search
CPC ......... B44C 1/17; B44C 1/175; B44C 1/1708; B44C 1/172; B44C 1/1733; B44C 1/1741; B44C 1/1754; B44C 1/1758; Y10T 428/24868; Y10T 428/1467; Y10T 428/24934; Y10T 428/24802; Y10T 428/14; Y10T 428/1486; C09J 7/02; C09J 7/0207; C09J 7/0203; C09J 7/026; C09J 2203/31; C09J 2203/334

See application file for complete search history.

(56) References Cited

U.S. PATENT DOCUMENTS

| | | | | |
|---|---|---|---|---|
| 2,654,170 A | * | 10/1953 | Nestor | G09F 3/02 156/DIG. 8 |
| 2001/0055677 A1 | * | 12/2001 | Wuu | D21H 19/58 428/343 |
| 2009/0117377 A1 | * | 5/2009 | Hacikyan | B32B 7/12 428/352 |
| 2009/0286032 A1 | * | 11/2009 | Franklin | G09F 3/0291 428/41.8 |
| 2011/0283443 A1 | * | 11/2011 | Simpson | A42B 3/26 2/424 |

* cited by examiner

*Primary Examiner* — Patricia L Nordmeyer
(74) *Attorney, Agent, or Firm* — Christina Chamberlain

(57) ABSTRACT

In the preferred embodiment, the present invention relates to a dissolvable, adhesive construction comprising a host material; a dissolvable facestock with an upper surface and a lower surface; an adhesive layer with an upper surface and a lower surface wherein the upper surface of the adhesive layer is in contact with the lower surface of facestock; and a dissolving material formulated to dissolve the facestock material wherein the facestock material disintegrates or disperses when it comes into contact with the dissolving material.

6 Claims, 6 Drawing Sheets

DISSOLVABLE, ADHESIVE CONSTRUCTION

RELATED APPLICATIONS

This application claims priority to U.S. Provisional Application No. 62/064,654 filed Oct. 16, 2014. The entire contents of the above application are hereby incorporated by reference as though fully set forth herein.

BACKGROUND

The present invention relates generally to a dissolvable, adhesive construction. More particularly, the present invention is a dissolvable, adhesive construction for the temporary masking, marking, fabrication, processing or combining components used in manufacturing or production. For example, in screen-printing, after the screen is coated with a light sensitive, solvent resistant coating, it is imaged, washed out with water and dried. Then some form of tape (usually masking or packaging tape) is placed on the inside of the screen, half on the frame and half on the coated mesh. Sometimes, the screen is flipped and more tape is applied to the backside as well for extra durability. However, when the screen is finished printing, it has the image coating and residue ink. The tape must now be removed so the chemicals can remove the ink and image coating. From a time standpoint, it is much quicker to apply tape to a clean screen then to remove it from a dirty screen. This same problem presents itself in a variety of parts production activities that require areas of a part to be masked off prior to additional processing and then the masked off tape to be removed manually.

Water dissolvable tapes are known in the prior art, such as that disclosed in U.S. Pat. No. 6,828,018 to Waterbury et. al. However, when water is the dissolving material, there are inherent limitations of use based on factors such as humidity, weather conditions, and water based processing applications. As such, it would be useful to have a tape construction that is water resistant to withstand rain, humidity, snow, etc. yet removable.

As such, it would be useful to have a customized tape to mask off areas and parts that need some form of processing that can still be removed without damage or any additional labor.

BRIEF SUMMARY OF THE INVENTION

The present invention seeks to meet this need by matching the material of the tape layer to one or more of the chemical components in the manufactured part itself. Then, when the removal of the manufactured part is removed, the dissolvable, adhesive construction is removed at the same time saving time and processing labor. In essence, the tape is made from a material that is chemically compatible/targeted with a host material in that it acts like the host material and can be removed or processed without additional handling or processing. Removal is accomplished with a dissolving liquid formulated to match the chemistry of the layer(s).

For example, in the screen-printing industry, a tape application is required to form a bridge between the screen mesh, the stencil and the screen frame. This tape must be hand applied to all four sides of the frame and then removed when the screen has been printed for reclamation and reuse. Labor is incurred in applying the tape and once again in the removal of the tape for screen reclamation. The imagable stencil coating that is reclaimed is typically made from a PVA base formula. Therefore the tape material would be formulated with a similar chemical material. Then, when the appropriate chemical, such as a Sodium Metaperiodate solution, is used to dissolve the coating, the tape is dissolved as well.

In other printing applications that require a printing plate be made and processed, the tape can be applied to edges and areas that need protection prior to and during processing. Then after processing, the plate is coated with the proper liquid for dissolving and removal.

In other manufacturing processes, labeling of components might be necessary to control parts and finished products. The use of a chemical specific dissolving tape would allow these components to be marked without the necessity of manual removal upon completion. The dissolving liquid would be applied to dissolve and remove the tape. The dissolvable, adhesive construction can be used for Masking, Marking, Labels, and Removable Coatings.

DETAILED DESCRIPTION

Turning to FIGS. 1, 3, 4-5 and 7, in one embodiment, the invention relates to a dissolvable, adhesive construction comprising a host material 104; a dissolvable facestock 201 with an upper surface and a lower surface; an adhesive layer 203 with an upper surface and a lower surface wherein the upper surface of the adhesive layer 203 is in contact with the lower surface of facestock 202; and a dissolving material formulated to dissolve the facestock 202 material wherein the facestock 202 material disintegrates or disperses when it comes into contact with the dissolving material.

The adhesive may be of the pressure sensitive type such as acrylics, modified acrylics and others. Alternatively, the adhesive may be an activated adhesive such as gum or collagen based adhesives, as well as others known in the prior art.

Figure 1:
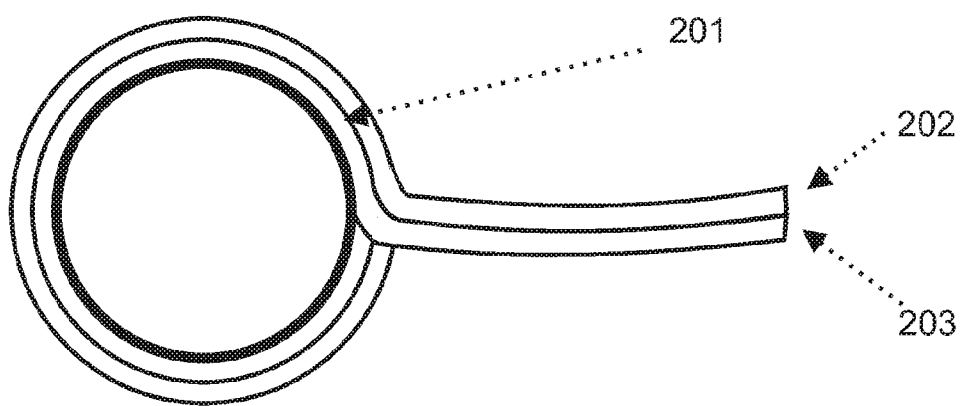
FIG. 1 is a side view of the dissolvable, adhesive construction of the present invention wrapper around an optional core material.
Figure 2:
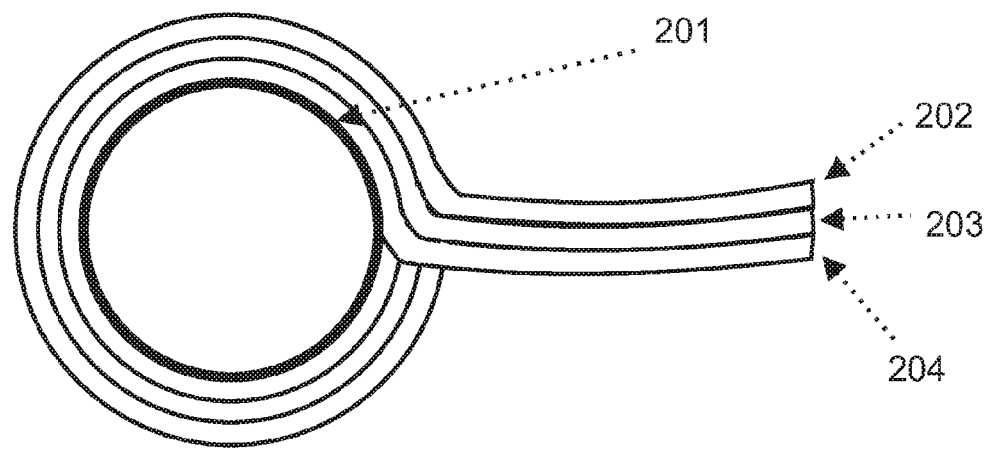
FIG. 2 is a side view of the dissolvable, adhesive construction of the present invention wrapped around an optional core material and optional backing material.
Figure 3:
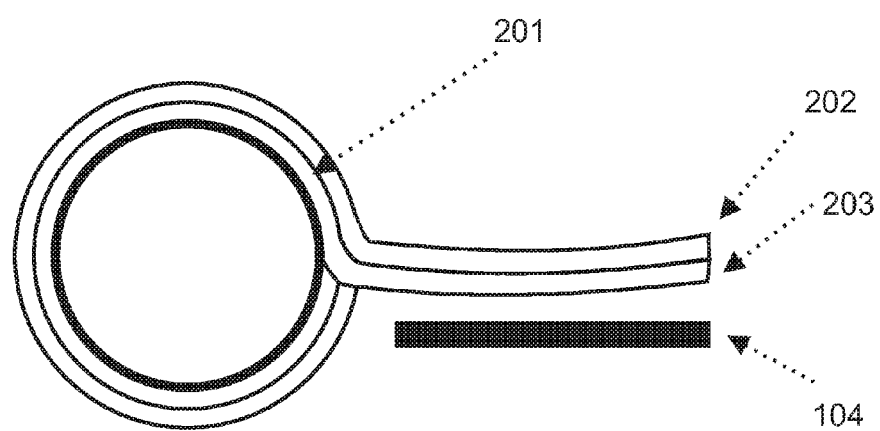
FIG. 3 is a side view of the dissolvable, adhesive construction of the present invention wrapped around an optional core material and optional backing material as placed along a host material.
Figure 4:
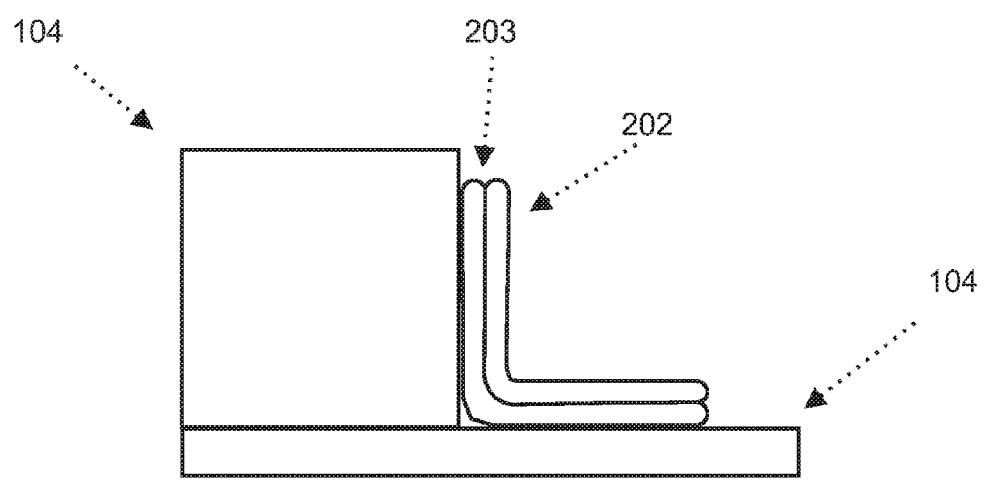
FIG. 4 is a side, cutaway view of the dissolvable, adhesive construction of the present invention applied to a host material.
Figure 5:
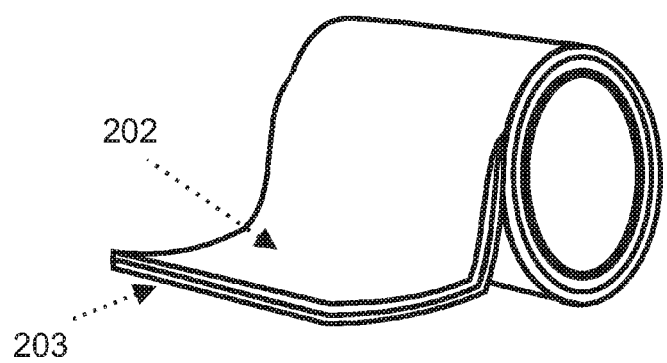
FIG. 5 is a front view of the dissolvable, adhesive construction of the present invention wrapped around an optional core material.
Figure 6:
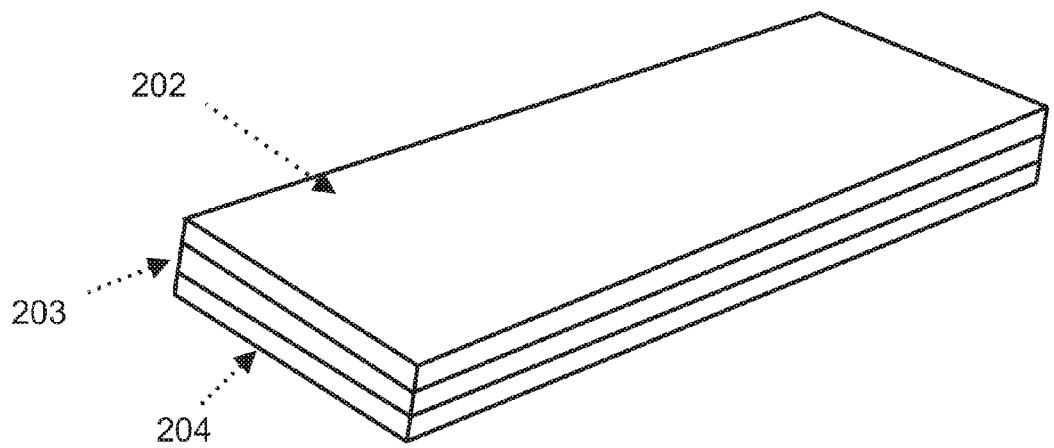
FIG. 6 is a side perspective view of the dissolvable, adhesive construction of the present invention with optional backing formed as a strip.

As shown in FIGS. 2 and 6, the present invention may further comprise a removable release material 204 with an upper and lower surface wherein the lower surface of the release material 204 is in contact with the upper surface of the facestock 202. The release coating may be peeled away from the facestock 202 prior to use.

Figure 7:
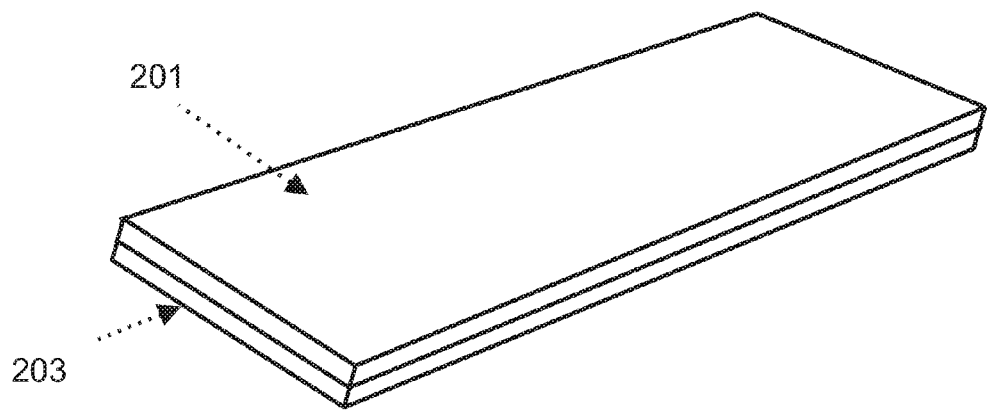
FIG. 7 is a side perspective view of the dissolvable, adhesive construction of the present invention formed as a strip.

The facestock 202 may be wound upon itself or may be wound around an optional core 201 material. As shown in FIGS. 1-3 and 5, the dissolvable facestock 202 may be in a film, label or tape form. As shown in FIGS. 6 and 7, the dissolvable facestock 202 may be a strip, a shape or sheet of material. The dissolvable, adhesive construction may be water resistant to withstand rain, humidity, snow, etc. yet removable.

The facestock 202 material may be chemically compatible with all or part of the host material, derived from all or part of the host material, and/or chemically identical to all or part of the host material. The host material 104 may be selected from the group comprising a printing plate, a screenprinting screen and an industrial component needing labeling or marking or combinations thereof.

Figure 8:
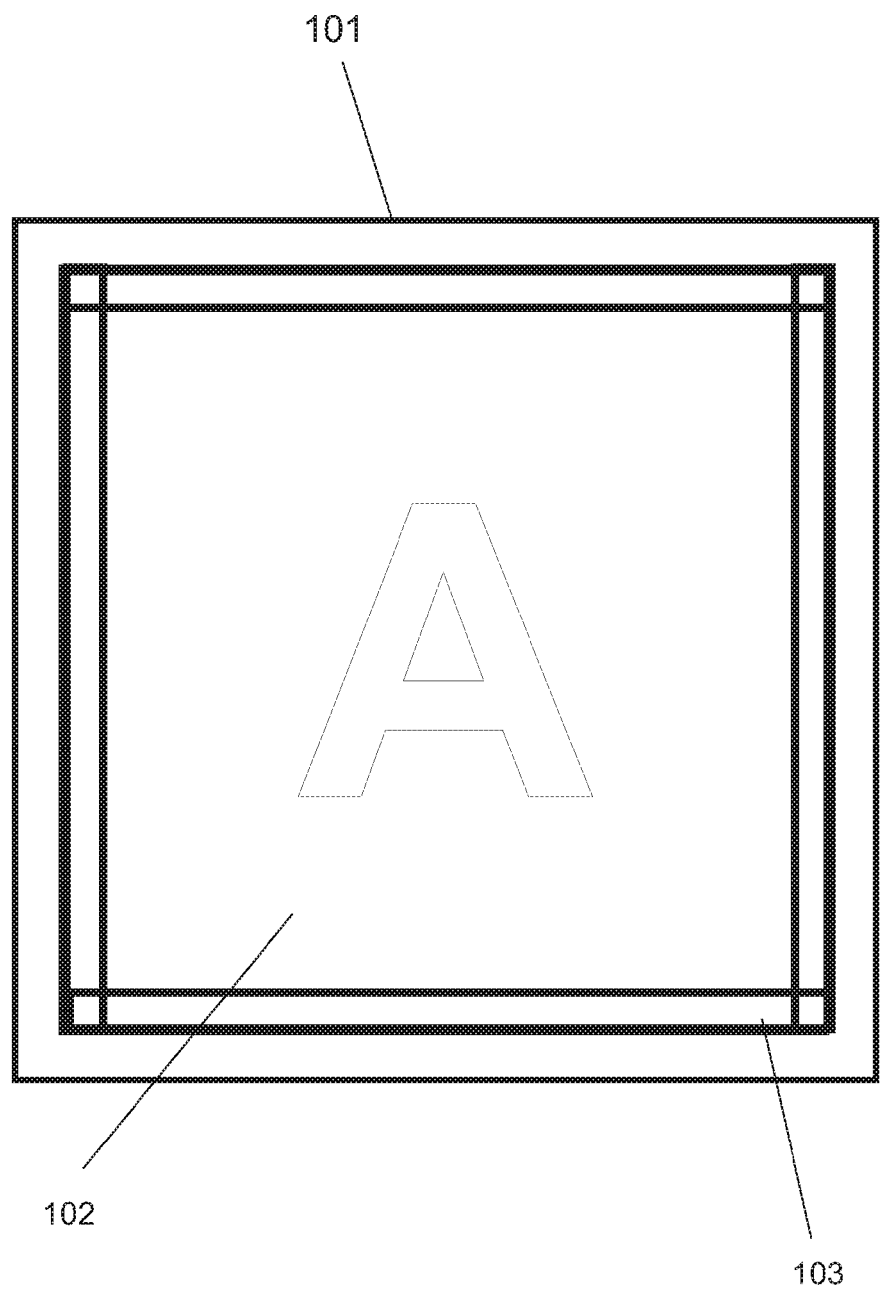
FIG. 8 is a front view of the dissolvable, adhesive construction of the present invention as applied to a screen-printing frame.
Figure 9:
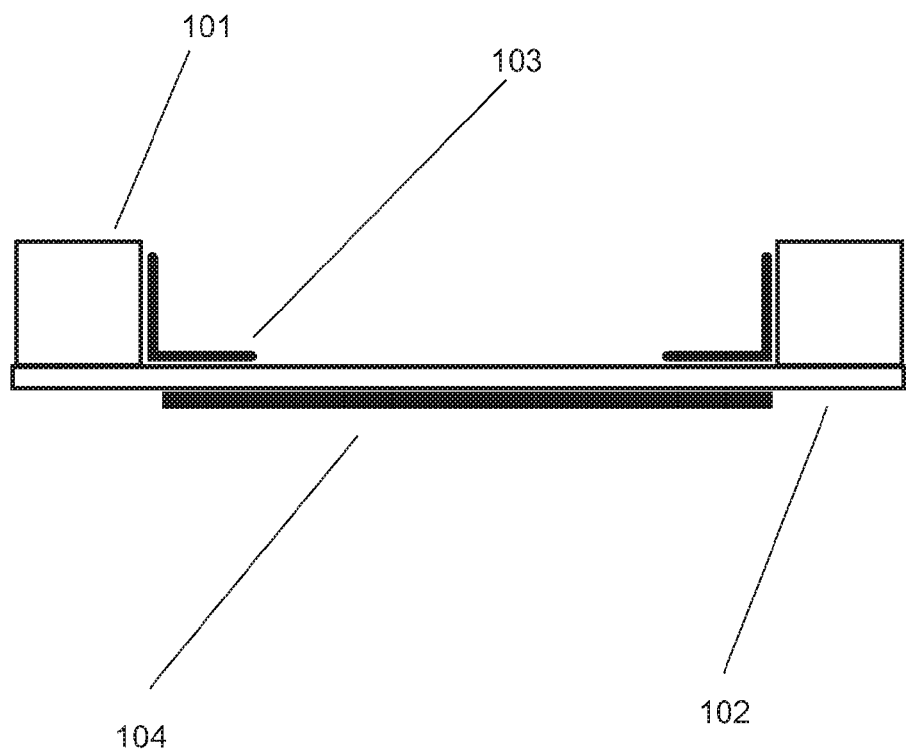
FIG. 9 is a side view of the dissolvable, adhesive construction of the present invention as applied to a screen-printing frame.

As shown in FIGS. 8 and 9, a screen-printing frame 101 is shown with an imaged stencil coating 102 on a host material 104 within the screen-printing frame 101. The dissolvable, adhesive construction 103 described above is applied to the screen-printing frame 101 and host material 104. The imagable stencil coating 102 in screen-printing uses is typically made from a polyvinyl acetate (PVA) base formula. As such, the facestock 202 is formulated with a similar chemical material. An appropriate dissolving liquid, such as a sodium metaperiodate solution, is used to dissolve the coating and the tape is dissolved as well, therefore allowing the stencil frame to be easily removed without any additional labor in peeling off the facestock 202.

Figure 10:
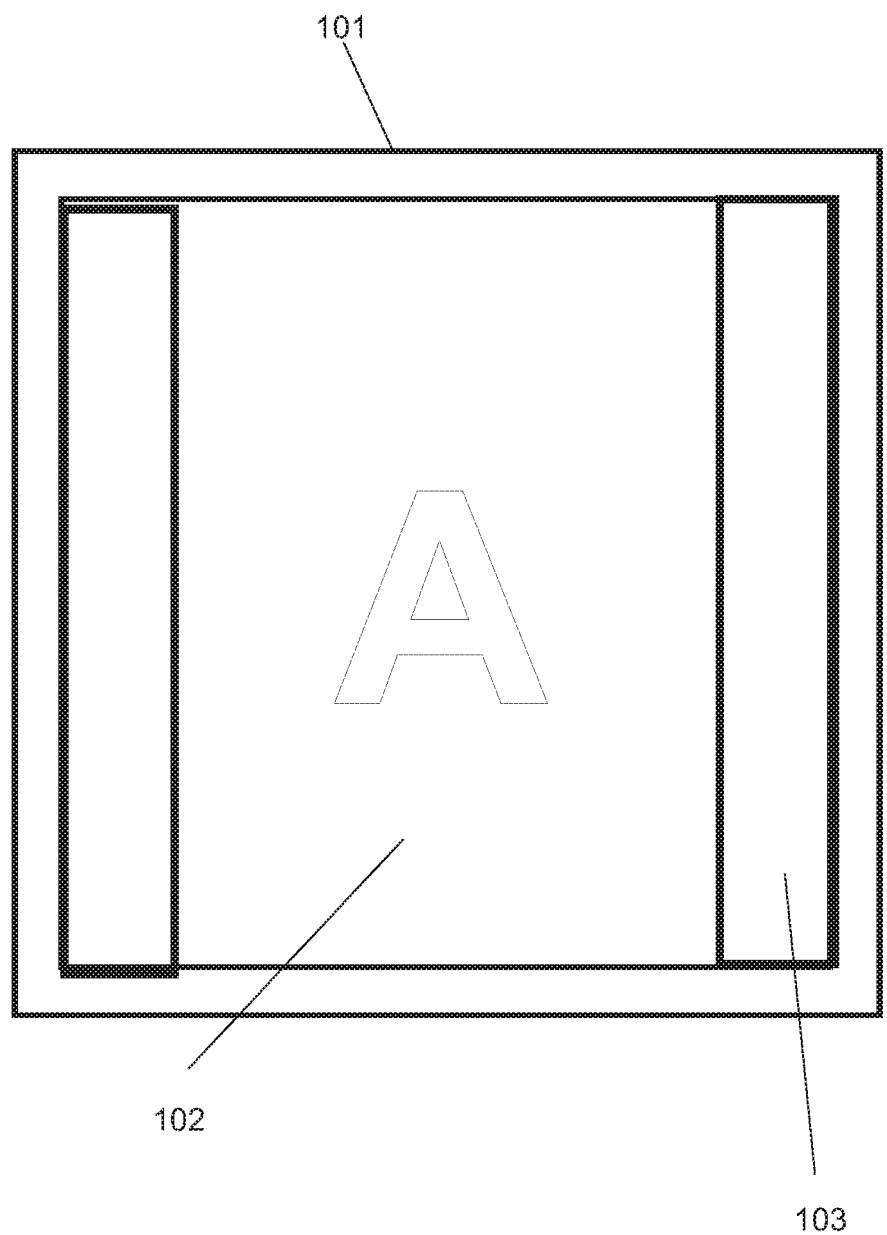
FIG. 10 is a front view of the dissolvable, adhesive construction of the present invention as applied to a screen-printing frame to block out side gutters of the screen-printing frame.

Turning to FIG. 10, some parts simply need masking or blocking. In a screenprinting example, the dissolvable, adhesive construction 103 is applied to the lower part of the screen to block any ink leakage. In other applications, dissolvable, adhesive construction 103 may be used to block leakage, seal sections or label components.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the method (and components of the individual operating components of the method) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections might be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An adhesive tape kit comprising:
   a. an adhesive construction comprising:
      i. a water resistant and chemically dissolvable facestock with an upper surface and a lower surface;
      ii. an adhesive layer with an upper surface and a lower surface wherein the upper surface of the adhesive layer is in contact with the lower surface of facestock; and
   b. a dissolving material formulated to dissolve the facestock material that is added to the facestock to facilitate facestock removal such that the facestock material dissolves when it comes into contact with the dissolving material; wherein the facestock material is made from a synthetic resin and the dissolving material is an oxidizing agent capable of dissolving said synthetic resin.

2. The kit of claim 1 wherein the dissolvable facestock is in a film, label or tape form.

3. The kit of claim 1 further comprising a removable release liner material with an upper and lower surface wherein the lower surface of the release liner material is in contact with the lower surface of the facestock adhesive material and the release liner is peeled away from the facestock prior to use.

4. The kit of claim 3 wherein the facestock is a strip, a shape or sheet of material.

5. The kit of claim 1 wherein the adhesive layer is a pressure sensitive adhesive or an activated adhesive.

6. The kit of claim 1 wherein the synthetic resin is polyvinyl acetate and wherein the oxidizing agent is sodium metaperiodate.

* * * * *